US012014844B2

(12) United States Patent
Mochizuki

(10) Patent No.: US 12,014,844 B2
(45) Date of Patent: Jun. 18, 2024

(54) WIRE HARNESS HAVING ADHESIVE TAPE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Taiji Mochizuki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 253 days.

(21) Appl. No.: 17/625,759

(22) PCT Filed: Jun. 26, 2020

(86) PCT No.: PCT/JP2020/025156
§ 371 (c)(1),
(2) Date: Jan. 9, 2022

(87) PCT Pub. No.: WO2021/010131
PCT Pub. Date: Jan. 21, 2021

(65) Prior Publication Data

US 2022/0277868 A1 Sep. 1, 2022

(30) Foreign Application Priority Data

Jul. 16, 2019 (JP) ................................ 2019-130953

(51) Int. Cl.
*H01B 7/00* (2006.01)

(52) U.S. Cl.
CPC .................................. *H01B 7/0045* (2013.01)

(58) Field of Classification Search
CPC .................................................... H01B 7/0045
(Continued)

(56) References Cited

U.S. PATENT DOCUMENTS 2,299,140 A * 10/1942 Hanson ................ H01B 7/0045 174/72 A
6,610,929 B1 * 8/2003 Motokawa .......... B60R 16/0207 174/72 A
(Continued)

FOREIGN PATENT DOCUMENTS

JP 2000-261932 A 9/2000
JP 2001-067955 A 3/2001
(Continued)

OTHER PUBLICATIONS

International Search Report dated Sep. 15, 2020 for WO 2021/010131 A1 (4 pages).

*Primary Examiner* — Timothy J Thompson
*Assistant Examiner* — Michael F McAllister
(74) *Attorney, Agent, or Firm* — Venjuris, P.C.

(57) ABSTRACT

It is an object of the present invention to provide a technology with which a protective portion with high protective capabilities is provided while avoiding an operation to switch out binding adhesive tape much as possible. A wire harness includes: a wire; and a tape-wrapping protective portion provided in at least a partial region along a longitudinal direction of the wire, the tape-wrapping protective portion including a spiral-wrapping portion in which an adhesive tape is wrapped in a spiral shape around the wire, and in the portion where the spiral-wrapping portion is provided, the adhesive tape being wrapped so as to form more than two layers.

5 Claims, 2 Drawing Sheets

(58) Field of Classification Search
USPC .......................................................... 174/72 A
See application file for complete search history.

(56) References Cited

U.S. PATENT DOCUMENTS

| | | | | |
|---|---|---|---|---|
| 7,854,989 | B2 | 12/2010 | Yabe et al. | |
| 2007/0173156 | A1* | 7/2007 | Kulper | B32B 25/10 442/293 |
| 2009/0101269 | A1* | 4/2009 | Pfaff | C09J 7/21 156/60 |
| 2010/0236827 | A1* | 9/2010 | Doi | H02G 3/0481 174/72 A |
| 2011/0061932 | A1* | 3/2011 | Ogawa | B60R 16/0207 174/72 A |
| 2011/0067920 | A1* | 3/2011 | Toyama | H02G 3/32 174/72 A |
| 2012/0238172 | A1* | 9/2012 | Siebert | B32B 7/12 156/185 |
| 2013/0273333 | A1* | 10/2013 | Meier | C09J 7/21 428/377 |
| 2015/0037523 | A1* | 2/2015 | Zielinski | B32B 17/061 428/35.2 |
| 2016/0064120 | A1* | 3/2016 | Wakabayashi | H01B 7/0045 174/72 A |
| 2016/0248236 | A1* | 8/2016 | Kaneko | H02G 3/0487 |
| 2019/0284439 | A1* | 9/2019 | Kerep | C09J 7/385 |

FOREIGN PATENT DOCUMENTS

| | | |
|---|---|---|
| JP | 2015-005352 A | 1/2015 |
| JP | 2016-117499 A | 6/2016 |

* cited by examiner

WIRE HARNESS HAVING ADHESIVE TAPE

CROSS REFERENCE TO RELATED APPLICATIONS

This application is a national phase of PCT application No. PCT/JP2020/025156, filed on 26 Jun. 2020, which claims priority from Japanese patent application No. 2019-130953, filed on 16 Jul. 2019, all of which are incorporated herein by reference.

TECHNICAL FIELD

The present disclosure relates to a wire harness.

BACKGROUND

In a wire harness, a protective member different from adhesive tape is provided at a portion where high protective capabilities are required. Examples of such a protective member include a sheet disclosed in Patent Document 1 and a corrugated tube disclosed in Patent Document 2, for example.

PRIOR ART DOCUMENT

Patent Document

Patent Document 1: JP 2007-128797A
Patent Document 2: JP 2000-261932A

SUMMARY OF THE INVENTION

Problems to be Solved

When a protective member different from adhesive tape is attached to a wire harness, an operation for switching the binding adhesive tape with a protective member needs to be performed.

Thus, it is an object of the present disclosure to provide a technology with which a protective portion with high protective capabilities is provided while avoiding an operation to switch out binding adhesive tape as much as possible.

Means to Solve the Problem

A wire harness according to the present disclosure includes: a wire; and a tape-wrapping protective portion provided in at least a partial region along a longitudinal direction of the wire, wherein the tape-wrapping protective portion includes a spiral-wrapping portion in which an adhesive tape is wrapped in a spiral shape around the wire, and in the portion where the spiral-wrapping portion is provided, the adhesive tape is wrapped so as to form more than two layers.

Effect of the Invention

With the present disclosure, a protective portion with high protective capabilities is provided while tending to avoid an operation to switch out binding adhesive tape.

DETAILED DESCRIPTION TO EXECUTE THE INVENTION

Figure 1:
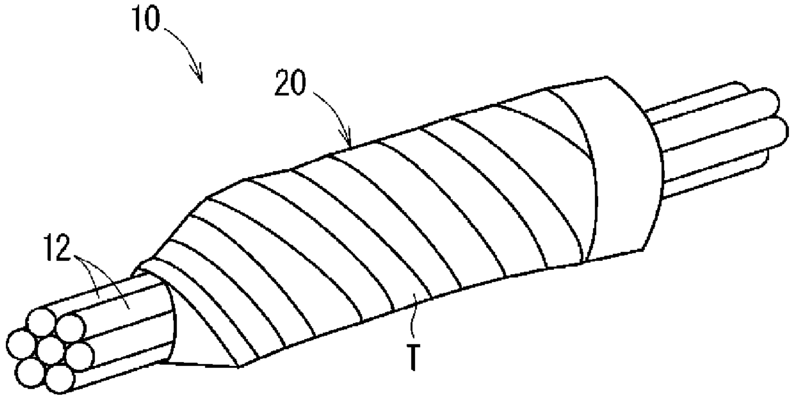
FIG. 1 is a perspective view showing a wire harness according to Embodiment 1.

Description of Embodiments of the Present Disclosure

First, embodiments of the present disclosure will be listed and described.

The wire harness of the present disclosure is as follows.

(1) A wire harness including: a wire; and a tape-wrapping protective portion provided in at least a partial region along a longitudinal direction of the wire, wherein the tape-wrapping protective portion includes a spiral-wrapping portion in which an adhesive tape is wrapped in a spiral shape around the wire, and in the portion where the spiral-wrapping portion is provided, the adhesive tape is wrapped so as to form more than two layers. As a result of wrapping the adhesive tape so as to form more than two layers in the portion where the spiral-wrapping portion is provided, the tape-wrapping protective portion has high protective capabilities. The tape-wrapping protective portion can be formed using adhesive tape. Accordingly, a protective portion with high protective capabilities is provided while tending to avoid an operation to switch out binding adhesive tape.

(2) The tape-wrapping protective portion may include a first tape-wrapping protective portion, and the spiral-wrapping portion of the first tape-wrapping protective portion may be an overlap wrapping portion in which the adhesive tape is wrapped so that a region greater than half of the width thereof is sequentially overlapped. Accordingly, with one spiral-wrapping portion, the adhesive tape forms more than two layers.

(3) The first tape-wrapping protective portion may further include an end portion wrapping portion that is provided at one end portion of the first tape-wrapping protective portion along the longitudinal direction of the wire, in the end portion wrapping portion, adhesive tape may be wrapped to form a plurality of layers at the same position, and a wrap-start portion of the overlap wrapping portion may overlap the outer circumferential side of the end portion wrapping portion. Accordingly, the thickness of one end portion of the first tape-wrapping protective portion can be increased.

(4) The wire harness may further include a connector provided at an end portion of the wire, wherein the end portion wrapping portion may be provided in the first-wrapping protective portion so as to be located nearest the connector in the longitudinal direction of the wire. Accordingly, the thickness of one end portion of the first tape-wrapping protective portion located near the connector can be increased.

(5) The tape-wrapping protective portion may include a second tape-wrapping protective portion, and a plurality of layers of the spiral-wrapping portion of the second tape-wrapping protective portion may overlap. Accordingly, the portion where the spiral-wrapping portion is provided can easily be made to have more than two layers.

(6) The spiral-wrapping portion of each layer in the second tape-wrapping protective portion may be wrapped in a spiral shape so that laps of the adhesive tape do not overlap. Accordingly, the adhesive tape of the spiral-wrapping portion of each layer can be wrapped with a small diameter and no gap.

Details of Embodiments of the Present Disclosure Specific examples of a wire harness of the present disclosure will be described below with reference to the drawings. Note that the present disclosure is not limited to these illustrative examples, but is indicated by the claims, and all changes that come within the meaning and range of equivalency of the claims are intended to be embraced therein.

Embodiment 1

Figure 2:
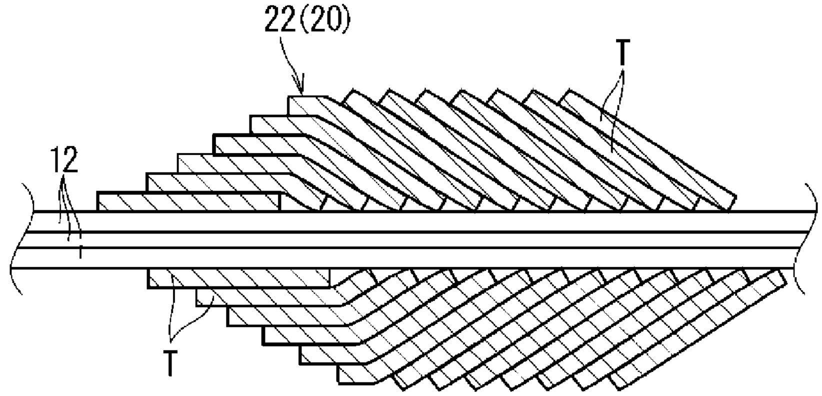
FIG. 2 is a vertical cross-sectional diagram showing the wire harness according to Embodiment 1.

A wire harness according to Embodiment 1 is described below. FIG. 1 is a perspective view showing a wire harness 10 according to Embodiment 1. FIG. 2 is a vertical cross-sectional diagram showing the wire harness 10 according to Embodiment 1.

The wire harness 10 is a wiring member for electrically connecting electrical components installed in a vehicle. The wire harness 10 includes a wire 12 and a tape-wrapping protective portion 20.

The wire 12 is a coated wire in which an insulating coating is formed around a core wire. The core wire is made of copper, aluminum, a copper alloy, or an aluminum alloy. The core wire may be made of a single wire member, or may be a stranded wire in which a plurality of wire strands are twisted together. The insulating coating is made of a resin such as PVC, polyethylene, and fluorocarbon resin. This wire 12 has the function of transmitting electric signals, electric power, or the like.

It is sufficient that the wire harness 10 has at least one wire 12. Here, the wire harness 10 is provided with a plurality of wires 12. The wires 12 may all have the same outer diameter, or include wires 12 with different outer diameters. A connector C (see FIG. 3) may be provided at an end portion of the wires 12.

A connector C is a resin housing that houses an end portion of a wire 12. For example, a terminal is connected to an end portion of a wire 12. This terminal is housed and held in a cavity formed in the housing. When the connector C is connected to a partner connecter, the terminal in the connector C is connected to a terminal in the partner connecter.

A plurality of wires 12 are branched at intermediate positions of the wire harness 10, and end portions thereof are respectively housed in a predetermined housing. Accordingly, the wire harness 10 is formed in a shape that corresponds to the wiring form of the wires 12 in the vehicle.

The tape-wrapping protective portion 20 is provided in at least a partial region along a longitudinal direction of the wires 12. The tape-wrapping protective portion 20 includes a spiral-wrapping portion 22. The spiral-wrapping portion 22 is a portion where adhesive tape T is wrapped around the wires 12 in the shape of a spiral.

Here, the wrapping method with which a single continuous piece of adhesive tape T is wrapped around the wires 12 will be described.

How a continuous piece of adhesive tape T is wrapped around the wires 12 is largely classified into a wrapping method where the adhesive tape T is wrapped while the adhering region thereof is shifted along the longitudinal direction of the wires 12, and a wrapping method where the adhesive tape T is wrapped without the adhering region thereof being shifted along the longitudinal direction of the wires 12. In the case of the former, the adhesive tape T wrapped around the wires 12 is passed around the wires 12 while shifting position along the longitudinal direction of the wires 12, in the shape of a spiral. In the case of the latter, the adhesive tape T wrapped around the wires 12 is passed around the wires 12 at a fixed position along the longitudinal direction of the wires 12, in the shape of a coil. Below, in the present specification, the former wrapping method is referred to as spiral wrapping, and the latter wrapping method is referred to as fixed-position wrapping.

Furthermore, the spiral wrapping is largely classified into a wrapping method where a portion in the width direction of the adhesive tape T is overlapped when the adhesive tape T makes more than one lap around the wires 12, and a wrapping method where the adhesive tape T is not overlapped in the width direction when the adhesive tape T makes more than one lap around the wires 12. In the case of the former, properties such as protection and water-proofing are improved because there are no gaps in the adhesive tape T along the longitudinal direction of the wires 12. Also, the thickness of a portion where the adhesive tape T is wrapped is increased by an amount corresponding to the portion where parts of the adhesive tape T overlap. In the case of the latter, a large area can be wrapped while suppressing the amount of adhesive tape T used. Also, the thickness of the portion where the adhesive tape T is wrapped is reduced by an amount that corresponds to the absence of overlapping adhesive tape T. Below, in the present specification, the former wrapping method is referred to as overlap wrapping, and the latter wrapping method is referred to as non-lap wrapping. Also, regarding overlap wrapping, the ratio of the overlapping width of the following wrapped portion to the full width of the previously wrapped portion is referred to as a lap margin. For example, overlap wrapping includes half-lap wrapping where half the width of the adhesive tape T is overlapped, and the like. The lap margin in half-lap wrapping is ½. Non-lap wrapping includes rough wrapping where gaps are formed between laps of the adhesive tape T in the longitudinal direction of the wires. Note that, in view of overlapping of the adhesive tape T, the non-lap wrapping is a wrapping method where the lap margin is zero. Also, the above fixed-position wrapping is a wrapping method where the entire width of the tape T is overlapped and the lap margin is one. Thus, the fixed-position wrapping may also be referred to as all-lap wrapping.

The above spiral-wrapping portion 22 is a portion where adhesive tape T is wrapped using spiral wrapping. In this way, a portion wrapped using a wrapping method described here can be treated as a wrapping portion that corresponds to the wrapping method thereof. For example, a portion wrapped using fixed-position wrapping can be considered a fixed-position wrapping portion.

Note that, when a continuous piece of adhesive tape T is wrapped around the wires 12, it goes without saying that the above-described wrapping methods can be combined as appropriate.

In the portion where the spiral-wrapping portion 22 is provided, the adhesive tape T is wrapped so as to form more than two layers. Here, the adhesive tape T does not necessarily need to be wrapped so as to form more than two layers throughout the entire portion where the spiral-wrapping portion 22 is provided. That is to say, the portion where the spiral-wrapping portion 22 is provided may include a portion in which the adhesive tape T is wrapped so as to form more than two layers, and also a portion where the adhesive tape T is wrapped so as to form two or less layers.

The tape-wrapping protective portion 20 according to the present example is provided with a first tape-wrapping protective portion 20. The spiral-wrapping portion 22 of the first tape-wrapping protective portion 20 is an overlap wrapping portion 22 in which the adhesive tape T is sequentially wrapped. In the overlap wrapping portion 22 of the present example, a region greater than half of the width of the adhesive tape T is overlapped. In other words, in the overlap wrapping portion 22, the lap margin is greater than ½ and smaller than 1.

Here, the intermediate region, excluding the wrap-start portion and the wrap-end portion, of the overlap wrapping portion 22 is considered. When the lap margin is ⅔, the adhesive tape T forms three layers in the entire intermediate region. Conversely, when the lap margin is greater than ½ and smaller than ⅔, the intermediate region includes both a portion where the adhesive tape T forms two layers and a portion where the adhesive tape T forms three layers. More specifically, if the lap margin is greater than ½ and smaller than ⅔, the portion where the adhesive tape T forms two layers and the portion where the adhesive tape T forms three layers extend in a spiral shape adjacent to each other in the intermediate region.

The relation between the lap margin and the layers of adhesive tape T is generalized as follows. That is, n is an integer of 2 or more. When the lap margin is (n−1) of n, the adhesive tape T has n layers in all portions of the intermediate region. When the lap margin is greater than (n−1) of n and smaller than (n+1) of n, the adhesive tape T extends in a spiral shape where an n layer portion and an (n+1) layer portion are adjacent to each other in the intermediate region. Accordingly, when the lap margin is greater than (n−1) of n, the adhesive tape T will have more than n layers in at least a portion of the intermediate region.

The spiral-wrapping portion 22 shown in FIG. 2 is an example of a case where the lap margin of the overlap wrapping portion 22 is ⅘. Naturally, the lap margin of the overlap wrapping portion 22 is not limited to this, and can be set as appropriate. The lap margin may be set in view of the thickness of the adhesive tape T and the finishing thickness (thickness from the inner surface on the wires 12 side to the outer surface) of the tape-wrapping protective portion 20, for example. Specifically, if the thickness of the adhesive tape T is 0.1 mm and the finishing thickness of the tape-wrapping protective portion 20 is to be 0.5 mm, by employing a ⅘ lap margin shown in FIG. 2, the required finishing thickness of the overlap wrapping portion 22 can be obtained.

The finishing thickness of the tape-wrapping protective portion 20 is not particularly limited, but may be 0.5 mm or more, for example. Also, the finishing thickness may be 1.0 mm or more, for example.

Effects Etc. of Embodiment 1

With the wire harness 10 configured as described above, as a result of wrapping the adhesive tape T so as to form more than two layers in the portion where the spiral-wrapping portion 22 is provided, the tape-wrapping protective portion 20 has high protective capabilities. The tape-wrapping protective portion 20 can be formed using the adhesive tape T. Thus, a protective portion with high protective capabilities is provided while tending to avoid an operation to switch out binding adhesive tape T.

Also, the spiral-wrapping portion 22 of the first tape-wrapping protective portion 20 is the overlap wrapping portion 22, which has a lap margin greater than ½, and thus, with one spiral-wrapping portion 22, the adhesive tape T forms more than two layers.

Embodiment 2

Figure 3:
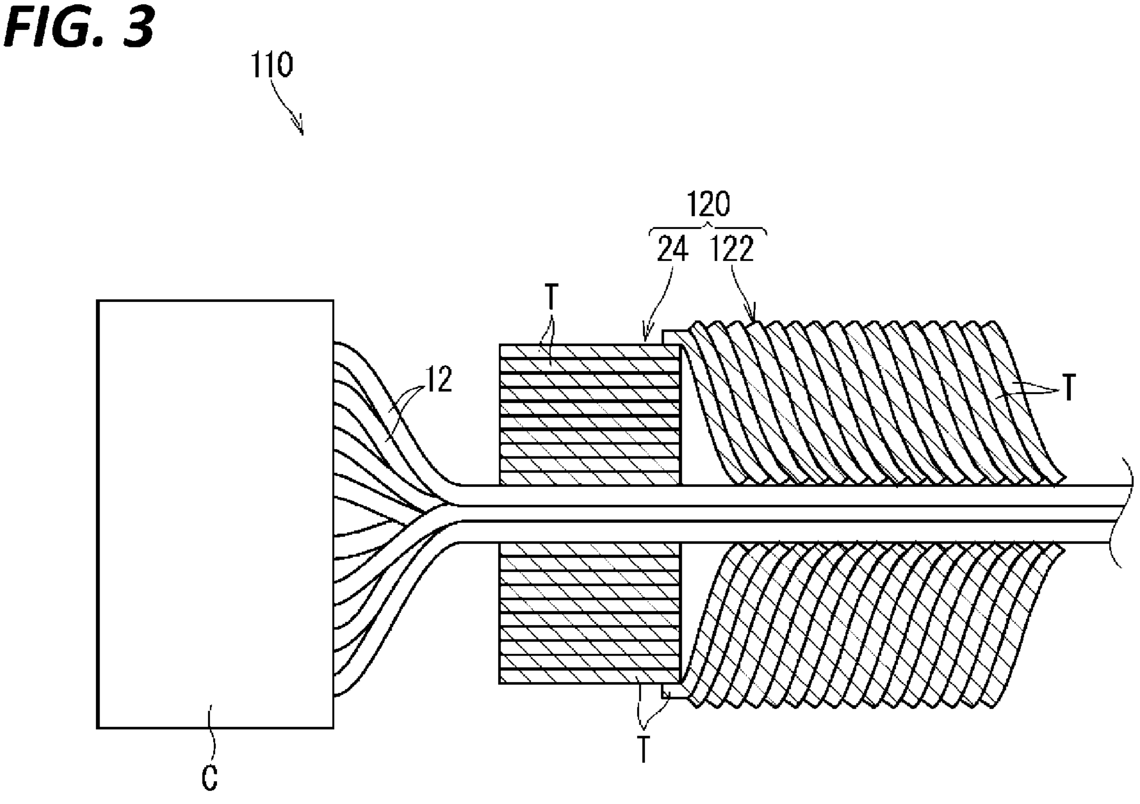
FIG. 3 is a vertical cross-sectional diagram showing a wire harness according to Embodiment 2.

A wire harness according to Embodiment 2 will be described. FIG. 3 is a vertical cross-sectional diagram showing a wire harness 110 according to Embodiment 2. Note that, in the description of the present embodiment, constitutional elements similar to those described above are given the same reference numerals and description thereof is omitted. This similarly applies to the following embodiments.

The wire harness 110 differs from the wire harness 10 according to Embodiment 1 in that a first tape-wrapping protective portion 120 further includes an end portion wrapping portion 24.

The end portion wrapping portion 24 is provided at one end portion of the first tape-wrapping protective portion 120 in the longitudinal direction of the wires 12. In the end portion wrapping portion 24, the adhesive tape T is wrapped at the same position to form layers. Accordingly, the end portion wrapping portion 24 is a fixed-position wrapping portion.

A spiral-wrapping portion 122 of the first tape-wrapping protective portion 120 is an overlap wrapping portion 122. The wrap-start portion of the overlap wrapping portion 122 overlaps the outer circumferential side of the end portion wrapping portion 24. The wrap-start portion of the overlap wrapping portion 122 starts on the other end portion side of the first tape-wrapping protective portion 120 relative to the center in the width direction of the end portion wrapping portion 24.

The adhesive tape T of the end portion wrapping portion 24 and the adhesive tape T of the overlap wrapping portion 122 may be separated. That is, the adhesive tape T may be cut once the end portion wrapping portion 24 has been fully wrapped, and wrapping of the overlap wrapping portion 122 may be started anew. In this case, there is no need to provide a bridging portion between the end portion wrapping portion 24 and the overlap wrapping portion 122.

The adhesive tape T of the end portion wrapping portion 24 and the adhesive tape T of the overlap wrapping portion 122 may also be one continuous piece. In this case, there is no need to cut the adhesive tape T once the end portion wrapping portion 24 has been fully wrapped. In the case where the adhesive tape T of the end portion wrapping portion 24 and the adhesive tape T of the overlap wrapping portion 122 is one continuous piece, it is preferable that the number of laps made at the bridging portion between the wrap-end portion of the end portion wrapping portion 24 and the wrap-start portion of the overlap wrapping portion 122 is as small as possible, for example, the number of laps may be smaller than one lap, and may be smaller than a half lap.

In this case, the end portion wrapping portion 24 is provided in the first-wrapping protective portion 120 so as to be located nearest the connector C in the longitudinal direction of the wires 12. At this time, the interval between the edge portion on the connector C side of the end portion wrapping portion 24 and the connector C in the longitudinal direction of the wires 12 is not particularly limited and can be set as appropriate. For example, the interval between the edge portion on the connector C side of the end portion wrapping portion 24 and the connector C may be 0 mm or more and 10 mm or less. The case where the interval between the edge portion on the connector C side and the connector C is 0 mm is a case where the end portion wrapping portion 24 and the connector C are in contact with each other.

The number of laps made at the end portion wrapping portion 24 is not particularly limited, provided there are two or more laps, and can be set as appropriate. For example, the number of laps made at the end portion wrapping portion 24 may be three or more, five or more, and ten or more. The number of laps made at the end portion wrapping portion 24 may be set in view of the thickness of the adhesive tape T and the finishing thickness of the tape-wrapping protective portion 120, for example. Specifically, if the thickness of the adhesive tape T is 0.1 mm and the finishing thickness of the tape-wrapping protective portion 120 is to be 1.0 mm, the number of laps made at the end portion wrapping portion 24 can be ten as shown in the example in FIG. 3. In this case, by making the lap margin of the overlap wrapping portion 122 9/10, the finishing thickness of the end portion wrapping portion 24 and the finishing thickness of the overlap wrapping portion 122 will be approximately the same.

The face of the connector C from which the wires 12 extend is a wire extension face. Normally, the wire extension face is the face in which the opening of the cavity is formed. The wire extension face has the shape of a square or a shape similar to a square. The finishing thickness of the end portion wrapping portion 24 may be the same as, greater than, or smaller than the length of the wire extension face in the short-side direction thereof. Also, the finishing thickness of the end portion wrapping portion 24 may be the same as, greater than, or smaller than the length of the wire extension face in the long-side direction thereof.

Effects Etc. of Embodiment 2

With the wire harness 110 according to the present example as well, similar effects to those of the wire harness 10 according to Embodiment 1 can be obtained. Furthermore, with the wire harness 110 according to the present example, the end portion wrapping portion 24 is provided, and thus the thickness of one end portion of the first tape-wrapping protective portion 120 can be increased. The end portion wrapping portion 24 is provided on the connector C side, and thus the thickness of the one end portion of the first tape-wrapping protective portion 120 located near the connector C can be increased. Accordingly, when the wire harness 110 is being attached to a vehicle, even if there is an edge or the like on the path on which the connector C is moved while being held, the wires 12 extending from the connector C can be protected from the edge and the like.

Embodiment 3

Figure 4:
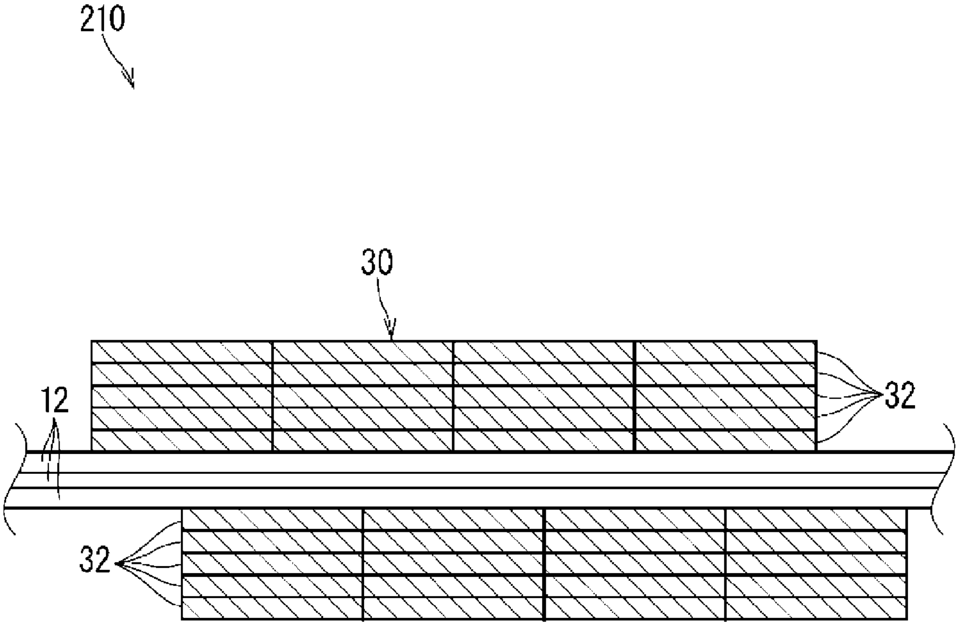
FIG. 4 is a vertical cross-sectional diagram showing a wire harness according to Embodiment 3.

A wire harness according to Embodiment 3 is described. FIG. 4 is a vertical cross-sectional diagram showing a wire harness 210 according to Embodiment 3.

The present example is an example where the tape-wrapping protective portion is a second tape-wrapping protective portion 30. A plurality of layers of a spiral-wrapping portion 32 of the second tape-wrapping protective portion 30 overlap.

The spiral-wrapping portion 32 of each layer of the second tape-wrapping protective portion 30 is wrapped in a spiral shape so that there is no overlap between laps of the adhesive tape T. Accordingly, the spiral-wrapping portion 32 of each layer in the second tape-wrapping protective portion 30 is a non-lap wrapping portion. Below, out of two layers that overlap while being in contact with each other in a thickness direction, the spiral-wrapping portion 32 layer on the inner side is an inner layer and the spiral-wrapping portion 32 layer on the outer side is an outer layer.

The adhesive tape T of the inner layer and the adhesive tape T of the outer layer may be separated. That is, the adhesive tape T may be cut once the inner layer has been fully wrapped, and then wrapping of the outer layer may be started anew. In this case, the inner layer and the outer layer can be wrapped using the same wrapping method. Accordingly, spiral orientation of the inner layer and the outer layer can be matched.

The adhesive tape T of the inner layer and the adhesive tape T of the outer layer may also be one continuous piece. In this case, there is no need to cut the adhesive tape T once the inner layer has been fully wrapped. If the adhesive tape T of the inner layer and the adhesive tape T of the outer layer is one continuous piece, the spiral orientation of the inner layer is the reverse of the outer layer. Also, the wrap-start portion of the outer layer overlaps the wrap-end portion of the inner layer.

In the example shown in FIG. 4, the spiral-wrapping portion 32 of each layer is non-lap wrapped so that no gap is formed between laps of the adhesive tape T. The spiral-wrapping portion 32 of each layer may also be non-lap wrapped so that a gap is formed between laps of the adhesive tape T. In this case, it is preferable that the gap in the inner layer and the gap in the outer layer do not overlap. That is, it is preferable that the adhesive tape T of the outer layer is positioned on the outer side of the gap in the inner layer, and the adhesive tape T of the outer layer covers the gap in the inner layer.

The number of layers of the spiral-wrapping portion 32 in the second tape-wrapping protective portion 30 is not particularly limited, and can be set as appropriate. For example, the number of layers of the spiral-wrapping portion 32 may be three or more, five or more, and ten or more. The number of layers of the spiral-wrapping portion 32 may be set in view of the thickness of the adhesive tape T and the finishing thickness of the second tape-wrapping protective portion 30, for example. Specifically, if the thickness of the adhesive tape T is 0.1 mm and the finishing thickness of the second tape-wrapping protective portion 30 is to be 0.5 mm, the number of layers formed by the spiral-wrapping portion 32 can be five as shown in the example shown in FIG. 3.

Effects Etc. Of Embodiment 3

With the wire harness 210 according to the present example as well, a protective portion with high protective capabilities is provided while obtaining the effect of tending to avoid an operation to switch out binding adhesive tape T, similar to the wire harness 10 according to Embodiment 1. Furthermore, with the wire harness 210, a plurality of layers of the spiral-wrapping portion 32 overlap, and thus the portion where the spiral-wrapping portion 32 is provided can easily be made to have more than two layers.

Also, the spiral-wrapping portion 32 of each layer in the second tape-wrapping protective portion 30 is wrapped in a spiral shape so that laps of the adhesive tape T do not overlap, and thus the adhesive tape T of each layer can be wrapped with a small diameter and no gap.

Note that the configurations described in the above embodiments and variations can be appropriately combined as long as no mutual contradiction occurs. For example, a plurality of the first tape-wrapping protective portions 20 and 120 and the second tape-wrapping protective portion 30 may be provided in one wire harness.

LIST OF REFERENCE NUMERALS

- 10, 110, 210 Wire harness
- 12 Wire
- 20, 120 First tape-wrapping protective portion (tape-wrapping protective portion)
- 22, 122 Spiral-wrapping portion (Overlap wrapping portion)
- 24 End portion wrapping portion

30 Second tape-wrapping protective portion (tape-wrapping protective portion)
32 Spiral-wrapping portion
C Connector
T Adhesive tape

What is claimed is:

1. A wire harness comprising:
a wire; and
a tape-wrapping protective portion provided in at least a partial region along a longitudinal direction of the wire,
wherein the tape-wrapping protective portion includes a spiral-wrapping portion in which an adhesive tape is wrapped in a spiral shape around the wire,
in the portion where the spiral-wrapping portion is provided, the adhesive tape is wrapped so as to form more than two layers,
the tape-wrapping protective portion includes a first tape-wrapping protective portion, and
the spiral-wrapping portion of the first tape-wrapping protective portion is an overlap wrapping portion in which the adhesive tape is wrapped so that a region greater than half of the width thereof is sequentially overlapped.

2. The wire harness according to claim 1,
wherein the first tape-wrapping protective portion further includes an end portion wrapping portion that is provided at one end portion of the first tape-wrapping protective portion along the longitudinal direction of the wire,
in the end portion wrapping portion, adhesive tape is wrapped to form a plurality of layers at the same position, and
a wrap-start portion of the overlap wrapping portion overlaps the outer circumferential side of the end portion wrapping portion.

3. The wire harness according to claim 2, further comprising
a connector provided at an end portion of the wire,
wherein the end portion wrapping portion is provided in the first-wrapping protective portion so as to be located nearest the connector in the longitudinal direction of the wire.

4. A wire harness comprising:
a wire; and
a tape-wrapping protective portion provided in at least a partial region along a longitudinal direction of the wire,
wherein the tape-wrapping protective portion includes a spiral-wrapping portion in which an adhesive tape is wrapped in a spiral shape around the wire,
in the portion where the spiral-wrapping portion is provided, the adhesive tape is wrapped so as to form more than two layers,
the tape-wrapping protective portion includes a second tape-wrapping protective portion, and
a plurality of layers of the spiral-wrapping portion of the second tape-wrapping protective portion overlap.

5. The wire harness according to claim 4,
wherein the spiral-wrapping portion of each layer in the second tape-wrapping protective portion is wrapped in a spiral shape so that laps of the adhesive tape do not overlap.

* * * * *